3,383,383
PENICILLANIC ACID DERIVATIVES
Fritz Gapp, Johann Margreiter, and Ekkehard Schmid, Tirol, Austria, assignors to Biochemie Ges.m.b.H., Vienna, Austria
No Drawing. Filed June 20, 1967, Ser. No. 647,330
41 Claims. (Cl. 260—239.1)

The present invention relates to new penicillins and a process for their production.

The invention provides penicillins of general Formula I

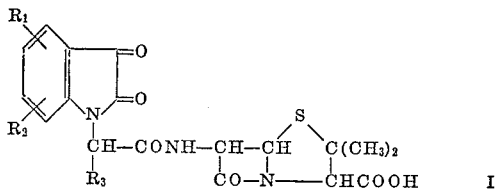

in which $R_1$ and $R_2$ are identical or different and each signify a hydrogen, fluorine, chlorine, bromine or iodine atom, a lower alkyl radical having 1 to 4 carbon atoms, a lower alkoxy radical having 1 to 4 carbon atoms, and $R_3$ signifies a hydrogen atom or a lower alkyl radical having 1 to 4 carbon atoms, and their salts with alkali metals or alkaline earth metals.

The salts of the penicillins of general Formula I are water-soluble and after parenteral administration they exhibit an extraordinarily long lasting and high concentration in the blood. After intramuscular administration of these compounds the concentration in the blood amounts to several times the value of Na-penicillin G, whereas the duration of the attainable, effective concentration in the blood may be compared with that of commercial depot penicillins, e.g., procain-penicillen G. The salts of the penicillins of general Formula I may be administered in the usual way that depot penicillins are administered.

The new penicillins of the invention have the advantage over commercial depot penicillins that they do not have the side effects caused by the basic components of the usual depot penicillins. On administration of commercial depot penicillins, great quantities of organic bases are necessarily administered; some of these organic bases lead to serious side effects or cause pain reactions.

The compounds of the invention may be used as pharmaceuticals on their own or in admixture with other susbtances in the treatment of infectious diseases in warm-blooded animals.

The present invention further provides a process for the production of compounds of general Formula I and their salts with alkali metals or alkaline earth metals, characterized in that a reactive derivative of isatin-N-alkane-carboxylic acids of general Formula II

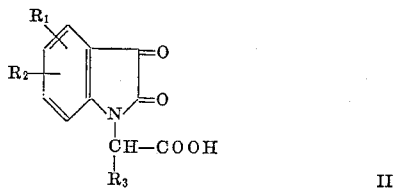

in which $R_1$ to $R_3$ have the above significance, is reacted with 6-aminopenicillanic acid or its salts in a suitable solvent or solvent mixture which is inert under the reaction conditions, and the resulting penicillins of general Formula I are then optionally converted into their salts with alkali metals or alkaline earth metals or are liberated from these.

The acid chlorides are preferably used as reactive derivatives of isatin-N-alkane-carboxylic acids for the process of the invention. However, other reactive derivatives of isatin-N-alkane-carboxylic acids, e.g., the bromides of said acids, mixed anhydrides, as may be obtained by reaction of an isatin-N-alkane-carboxylic acid with chloroformic acid esters, preferably chloroformic acid ethyl ester, p-nitrophenyl esters of acids of general Formula II and other reactive acid derivatives may likewise be used.

One preferred method of effecting the process of the invention consists in that the acid chloride, or a mixed anhydride of a compound of general Formula II is added in small portions while stirring and strongly cooling with a mixture of ice/common salt to a solution of an alkali metal salt, preferably the sodium salt, of 6-aminopenicillanic acid in a mixture of water and a partially or completely water-miscible solvent which is inert under the reaction conditions, e.g., dioxane tetrahydrofuran or dimethyl formamide, and the resulting reaction mixture is further stirred at a temperature between −10° and +30° C. at a pH value of about 6 to 9 for ½ to 2 hours. After the reaction has been completed, the penicillins of general Formula I are isolated in manner known per se from the reaction mixture, in which they are present as salts, e.g., by extracting with a suitable organic solvent which is inert under the reaction conditions, e.g., ethyl acetate, at an acid pH value, washing the extract, e.g., with water, drying and treating the extract with charcoal for purposes of decolouration and evaporating the purified extract to dryness, and the penicillins of Formula I are then optionally converted into their salts in an organic solvent which is inert under the reaction conditions, e.g., acetone, by reacting with suitable alkali metal compounds, e.g., sodium or potassium-2-ethyl hexanoate, or suitable alkaline earth metal compounds, e.g., calcium acetate.

In accordance with another embodiment of the process of the invention, the salts of the compounds of general Formula I may be precipitated from the extract obtained above by the addition of suitable compounds, e.g., the alkali metal or alkaline earth metal compounds indicated above.

The compounds of general Formula I may be liberated from the resulting salts in manner known per se, e.g., by treating with mineral acids.

The term "in manner known per se" as used herein designates methods in use or described in the literature on the subject.

In the following non-limitative examples, all temperatures are indicated in degrees centigrade and are corrected.

Example 1.—Potassium salt of 6-[α-(isatin-N)-acetamido]-penicillanic acid 400 cc. of tetrahydrofuran are added to a solution of 9.7 g. of 6-aminopenicillanic acid and 9.7 g. of sodium bicarbonate in 200 cc. of water and 10 g. of isatin-N-acetic acid chloride are added in small portions during the course of 15 minutes while stirring vigorously and cooling (with ice/common salt). After the addition has been completed, stirring is continued for 1 hour with cooling. The mixture is then diluted with water and extracted twice with ether. After the addition of 200 cc. of ethyl acetate, the mixture is acidified by the slow addition of phosphoric acid while stirring, the ethyl acetate phase is separated, washing with water, drying over sodium sulphate and treatment with charcoal are effected. After filtration careful evaporation in a vacuum is effected, whereby 6-[α-(isatin-N)-acetamido]-penicillanic acid is obtained in the form of an amorphous yellow orange powder. The potassium salt is produced by dissolving the acid in 200 cc. of acetone and adding 45 cc. of a 1 M solution of potassium-2-ethyl hexanoate in acetone, whereby a yellowish precipitate results, which is filtered with suction, washed with acetone and ether and dried in an exsiccator. The potassium salt shows an iodometric mg. activity of 1270 U. Water content: 4.95%. $[\alpha]_D^{20}=+204°$ (c.=1 in water).

On storing at room temperature in the air, the potassium salt absorbs water up to a constant value of about 9.8%, which corresponds to a content of water of crystallization of 3 mols.

Example 2.—Sodium salt of 6-[α-(isatin-N)-acetamido]-penicillanic acid

Triethyl amine is added dropwise while stirring to a suspension of 50 g. of 6-aminopenicillanic acid in 500 cc. of water and 500 cc. of tetrahydrofuran until the material dissolves. Cooling is then effected with a mixture of ice/common salt and 40 g. of isatin-N-acetic acid chloride are added during the course of 30 minutes while stirring. The resulting reddish solution is diluted with 500 cc. of water and extracted with 2 liters of ethyl acetate while acidifying with dilute hydrochloric acid. The separated ethyl acetate solution is dried over sodium sulphate and treated with charcoal. After filtration, concentration is effected in a vacuum to 600 cc. On adding a solution of 30 g. of sodium-2-ethyl hexanoate in 100 cc. of absolute ethanol, the sodium salt crystallizes in the form of yellow crystals. The sodium salt is filtered with suction, washed with ethyl acetate and ether and dried in a vacuum at 50°. The resulting sodium salt shows an iodometric mg. activity of 1380 U. Water content: 2.7%. $[\alpha]_D^{20}=+231°$ (c.=1 in water).

(Example 3.—6-[α-(isatin-N)-acetamido]-penicillanic acid

A solution of 2 g. of the potassium salt produced in accordance with Example 1 in 10 cc. of water is acidified dropwise with 2 N hydrochloric acid while cooling and stirring. The resulting acid is filtered with suction, washed several times with cold water and dried over phosphorus pentoxide. The acid shows an iodometric mg. activity of 1450 U. $[\alpha]_D^{20}=+228°$ (c.=0.1 butanol). The acid slowly decomposes on heating over 120°.

Example 4.—Potassium salt of 6-[α-(5-chloroisatin-N)-acetamido]-penicillanic acid 3.5 g. of 5-chloroisatin-N-acetic acid chloride are added in small portions while stirring to a solution cooled with ice/common salt of 3.2 g. 6-aminopenicillanic acid and 4 g. of sodium bicarbonate in 60 cc. of water and 100 cc. of tetrahydrofuran. After 30 minutes the mixture is diluted with water, washed with ether and the penicillin is extracted with 100 cc. of ethyl acetate after acidifying with phosphoric acid. The dried ethyl acetate solution which has been treated with charcoal is evaporated to dryness in a vacuum and the residue is taken up in 100 cc. of acetone. After the addition of 17 cc. of a 1 M solution of potassium-2-ethyl hexanoate in acetone, the potassium salt results as an almost colourless precipitate, which is filtered with suction, washed with acetone and ether and dried. The potassium salt shows an iodometric mg. activity of 1220 U. $[\alpha]_D^{20}=+209°$ (c.=0.5 in water). Water content: 3.0% (theoretically for 1 mol of water 3.6%). On standing in the air the water content slowly rises to 3 mols.

Example 5.—6-[α-(5-chloroisatin-N)-acetamido]-penicillanic acid 2 g. of the potassium salt produced in accordance with Example 4 are dissolved in 20 cc. of water and the solution is acidified with 2 N hydrochloric acid while stirring. The precipitated acid is filtered with suction, washed with water and dried. The acid shows an iodometric mg. activity of 1340 U. $[\alpha]_D^{20}=+226°$ (c.=0.5 in butanol). The acid contains 1 mol of water; on heating over 150° decomposition occurs.

Example 6.—Potassium salt of 6-[α-(5-methylisatin-N)-acetamido]-penicillanic acid A solution of 4.8 g. of 5-methylisatin-N-acetic acid chloride in 20 cc. of tetrahydrofuran is added dropwise at −10° while stirring to a solution of 4.4 g. of 6-aminopenicillanic acid and 4.4 g. of sodium bicarbonate in 40 cc. of water and 20 cc. of tetrahydrofuran. After stirring for 30 minutes the mixture is diluted with water, washed with ether and the penicillin is extracted with 100 cc. of ethyl acetate after acidifying with phosphoric acid. The ethyl acetate phase which has been washed with water is treated with charcoal and then carefully evaporated in a vacuum. The residue is taken up in 100 cc. of acetone and 20 cc. of a 1 M potassium-2-ethyl hexanoate solution in acetone are added, whereby the potassium salt results as light orange precipitate. The precipitate is filtered with suction, washed with acetone and ether and dried. The potassium salt shows an iodometric mg. activity of 1320 U. $[\alpha]_D^{20}=+201°$ (c.=1 in water). Water content: 4%.

Example 7.—6-[α-(5-methylisatin-N)-acetamido]-penicillanic acid

The free acid is precipitated with dilute hydrochloric acid from the aqueous solution of the potassium salt produced in accordance with Example 6. After washing out with water and drying over phosphorus pentoxide the free acid shows an iodometric mg. activity of 1385 U. $[\alpha]_D^{20}=+226°$ (c.=0.5 butanol).

Example 8.—Potassium salt of 6-[α-(5,6-dimethylisatin-N)-acetamido]-penicillanic acid 2.5 g. of 5,6-dimethylisatin-N-acetic acid chloride are slowly added while stirring and cooling with ice to a solution of 2.5 g. of 6-aminophenicillanic acid and 2.5 g. of sodium bicarbonate in 50 cc. of water and 50 cc. of tetrahydrofuran. After stirring for 1 hour the mixture is diluted with water and the penicillin is extracted with butyl acetate after acidifying by the careful addition of phosphoric acid. After drying the butyl acetate solution over sodium sulphate and adding 10 cc. of a 1 M solution of potassium-2-ethyl hexanoate in acetone the potassium salt precipitates in the form of fine needles. The resulting potassium salt shows an iodometric mg. activity of 1370 U. $[\alpha]_D^{20}=+187°$ (c.=0.5 in water).

The penicillins indicated in the following Table 1 are produced in accordance with the process described in Examples 1, 2, 4, 6 and 8.

TABLE 1

| Penicillins | Iodometric activity, U/mg. | $[\alpha]_D^{20}$ (c.=0.5 in H₂O), ° C. |
|---|---|---|
| Sodium salt of 6-[α-(4-chloroisatin-N)-acetamido]-penicillanic acid | 1,015 | +166.5 |
| Sodium salt of 6-[α-(6-chloroisatin-N)-acetamido]-penicillanic acid | 1,020 | +161.0 |
| Sodium salt of 6-[α-(4-bromoisatin-N)-acetamido]-penicillanic acid | 740 | +187.0 |
| Potassium salt of 6-[α-(5-bromoisatin-N)-acetamido]-penicillanic acid | 1,070 | +163.0 |
| Sodium salt of 6-[α-(5-fluoroisatin-N)-acetamido]-penicillanic acid | 1,180 | +151.0 |
| Sodium salt of 6-[α-(5-iodoisatin-N)-acetamido]-penicillanic acid | 910 | +134.0 |
| Sodium salt of 6-[α-(6-methylisatin-N)-acetamido]-penicillanic acid | 1,050 | +173.0 |
| Potassium salt of 6-[α-(7-methylisatin-N)-acetamido]-penicillanic acid | 1,305 | +152.0 |
| Potassium salt of 6-[α-(5-methoxyisatin-N)-acetamido]-penicillanic acid | 1,230 | 1 +145.0 |
| Sodium salt of 6-[α-(5-bromo-6-methylisatin-N)-acetamido]-penicillanic acid | 1,003 | +155.0 |
| Sodium salt of 6-[D,L-α-(isatin-N)-propionamido]-penicillanic acid | 1,190 | +142.5 |
| Sodium salt of 6-[D,L-α-(5-methylisatin-N)-propionamido]-penicillanic acid | 1,310 | +145.0 |
| Sodium salt of 6-[D,L-α-(5-chloroisatin-N)-propionamido]-penicillanic acid | 975 | +140.0 |
| Sodium salt of 6-[D,L-α-(5-bromoisatin-N)-propionamido]-penicillanic acid | 940 | +125.0 |
| Potassium salt of 6-[α-(5,7-dimethyl-N)-acetamido]-penicillanic acid | 1,355 | +105.0 |
| Sodium salt of 6-[α-(5-ethylisatin-N)-acetamido]-penicillanic acid | 1,220 | +183.0 |

The reactive derivatives of isatin-N-alkane-carboxylic acids of general Formula II used as starting materials for the process of the invention may be produced from the corresponding free acids in manner known per se; for example the acid chlorides are produced by heating the free acid for 15 to 30 minutes with a ten-fold quantity per volume of thionyl chloride. The free isatin-N-alkane-carboxylic acids of general Formula II have already been described in the literature or may be obtained in manner known per se, e.g., as described in Ber. 61, 944, and J. Chem. Soc. 1934, 1512.

The following Tables 2 and 3 indicate the physical data of some of the acids of general Formula II and their acid chlorides.

What is claimed is:
1. A compound selected from the group consisting of a compound of formula:

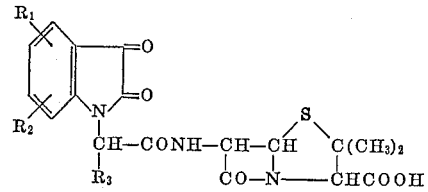

in which $R_1$ and $R_2$ are the same or different and each is hydrogen, fluorine, chlorine, bromine or iodine, lower alkyl of 1 to 4 carbon atoms, or lower alkoxy of 1 to 4

TABLE 2

| Compound | Appearance, recrystallized from— | Melting point in °C. | Formula | Molecular weight | Analysis, percent Calculated C | Calculated H | Found C | Found H |
|---|---|---|---|---|---|---|---|---|
| (a) | (b) | (c) | (d) | (e) | (f) | (g) | (h) | (i) |
| Isatin-N-acetic acid [1] | Orange needles (water) | [2] 209–211 | $C_{10}H_7NO_4$ | 205.17 | | | | |
| 4-chloroisatin-N-acetic acid | Orange leaflets (ethanol) | 260–266 | $C_{10}H_6ClNO_4$ | 239.62 | 50.12 | 2.52 | 50.08 | 2.77 |
| 6-chloroisatin-N-acetic acid | Yellow needles (dilute ethanol) | 271–273 | $C_{10}H_6ClNO_4$ | 239.62 | 50.12 | 2.52 | 50.12 | 2.68 |
| 5-bromoisatin-N-acetic acid | Yellow-orange crystals (dilute ethanol). | 215–220 | $C_{10}H_6BrNO_4$ | 284.08 | 42.28 | 2.13 | 42.34 | 2.26 |
| 5-nitroisatin-N-acetic acid [1] | Yellow needles (dilute ethanol) | [3] 211–213 | $C_{10}H_6N_2O_4$ | 251.18 | | | | |
| 5-methylisatin-N-acetic acid | Orange needles (glacial acetic acid) | 232–234 | $C_{11}H_9NO_4$ | 219.20 | 60.27 | 4.14 | 60.20 | 4.20 |
| 7-methylisatin-N-acetic acid | Orange tablets (ethanol) | 212–215 | $C_{11}H_9NO_4$ | 219.20 | 60.27 | 4.14 | 60.16 | 4.22 |
| 5-methoxyisatin-N-acetic acid | Red-brown needles (ethanol) | 189–194 | $C_{11}H_9NO_5$ | 235.20 | 56.17 | 3.86 | 55.90 | 3.85 |
| Isatin-N-α-propionic acid | Red crystals (dilute ethanol) | 174–176 | $C_{11}H_9NO_4$ | 219.20 | 60.27 | 4.14 | 59.88 | 4.24 |
| 5-chloroisatin-N-α-propionic acid | Orange crystals (glacial acetic acid) | 197–200 | $C_{11}H_8ClNO_4$ | 253.65 | 52.09 | 3.18 | 52.00 | 3.47 |
| 5-bromoisatin-N-α-propionic acid | Red crystals (dilute ethanol) | 219–225 | $C_{11}H_8BrNO_4$ | 298.11 | 44.32 | 2.70 | 44.47 | 2.92 |
| 6-methylisatin-N-acetic acid | Orange needles (dilute ethanol) | 235–237 | $C_{11}H_9NO_4$ | 219.20 | 60.27 | 4.14 | 60.66 | 4.12 |
| 5-methylisatin-N-α-propionic acid | Orange needles (water) | 180–184 | $C_{12}H_{11}NO_4$ | 233.23 | 61.80 | 4.75 | 61.77 | 4.88 |
| 5-iodoisatin-N-acetic acid | Orange crystals (water) | 225–228 | $C_{10}H_6INO_4$ | 331.08 | 36.28 | 1.83 | 36.30 | 1.89 |
| 5-fluoroisatin-N-acetic acid | Yellow-brown needles (water) | 178–180 | $C_{10}H_6FNO_4$ | 223.16 | 53.82 | 2.71 | 53.86 | 2.81 |
| 5-bromo-6-methylisatin-N-acetic acid | Yellow needles (ethanol) | 255–258 | $C_{11}H_8BrNO_4$ | 298.11 | 44.32 | 2.70 | 44.60 | 2.81 |
| 5-chloroisatin-N-acetic acid | Yellow needles (water) | 202–205 | $C_{10}H_6ClNO_4$ | 239.62 | 50.12 | 2.52 | 50.17 | 2.75 |
| 4-bromoisatin-N-acetic acid | Orange leaflets (ethanol) | 272–274 | $C_{10}H_6BrNO_4$ | 284.08 | 42.28 | 2.13 | 42.52 | 2.21 |
| 5-ethylisatin-N-acetic acid | Orange leaflets (water) | 168–170 | $C_{12}H_{11}NO_4$ | 233.23 | 61.80 | 4.75 | 61.62 | 4.92 |
| 5,6-dimethylisatin-N-acetic acid | Yellow needles (ethanol) | 239–242 | $C_{12}H_{11}NO_4$ | 233.23 | 61.80 | 4.75 | 61.56 | 4.85 |
| 5,7-dimethylisatin-N-acetic acid | Red crystals (ethanol) | 213–215 | $C_{12}H_{11}NO_4$ | 233.23 | 61.80 | 4.75 | 62.38 | 4.79 |

[1] Langenbeck, Ber. 61, 944.  [2] Lit.: 206–207.  [3] Lit.: 207.

TABLE 3

| Compound | Appearance, recrystallized from— | Melting point in °C. | Formula | Molecular weight | Calculated C | Calculated H | Found C | Found H |
|---|---|---|---|---|---|---|---|---|
| (a) | (b) | (c) | (d) | (e) | (f) | (g) | (h) | (i) |
| Isatin-N-acetic acid chloride [1] | Yellow needles (petroleum ether) | 139–141 | $C_{10}H_6ClNO_3$ | 223.62 | | | | |
| 4-chloroisatin-N-acetic acid chloride | Yellow leaflets (benzene) | 144–146 | $C_{10}H_5Cl_2NO_3$ | 258.07 | 46.54 | 1.95 | 46.65 | 2.01 |
| 5-chloroisatin-N-acetic acid chloride | Yellow needles (benzene) | 178–180 | $C_{10}H_5Cl_2NO_3$ | 258.07 | 46.54 | 1.95 | 46.57 | 1.97 |
| 6-chloroisatin-N-acetic acid chloride | Yellow crystals (benzene) | 182–183 | $C_{10}H_5Cl_2NO_3$ | 258.07 | 46.54 | 1.95 | 46.80 | 2.09 |
| 5-bromoisatin-N-acetic acid chloride | Yellow needles (benzene/petroleum ether). | 157–159 | $C_{10}H_5BrClNO_3$ | 302.53 | 39.71 | 1.67 | 40.00 | 1.60 |
| 5-nitroisatin-N-acetic acid chloride | Yellow needles (benzene/petroleum ether). | 141–143 | $C_{10}H_5ClN_2O_5$ | 268.62 | | | | |
| 5-methylisatin-N-acetic acid chloride | Orange needles (benzene/petroleum ether). | 160–162 | $C_{11}H_8ClNO_3$ | 237.65 | 55.59 | 3.39 | 55.71 | 3.57 |
| 7-methylisatin-N-acetic acid chloride | Red crystals (benzene) | 97–102 | $C_{11}H_8ClNO_3$ | 237.65 | 55.59 | 3.39 | 55.88 | 3.57 |
| Isatin-N-α-propionic acid chloride | Orange needles (benzene/petroleum ether). | 109–112 | $C_{11}H_8ClNO_3$ | 237.65 | 55.59 | 3.39 | 55.69 | 3.49 |
| 5-chloroisatin-N-α-propionic acid chloride. | Orange needles (benzene/petroleum ether). | 118–120 | $C_{11}H_7Cl_2NO_3$ | 272.10 | 48.55 | 2.59 | 48.64 | 2.69 |
| 5-bromoisatin-N-α-propionic acid chloride. | Orange prisms (benzene/petroleum ether). | 127–129 | $C_{11}H_7BrClNO_3$ | 316.56 | 41.74 | 2.23 | 42.24 | 2.42 |
| 6-methylisatin-N-acetic acid chloride | Yellow needles (benzene/petroleum ether). | 136–140 | $C_{11}H_8ClNO_3$ | 237.65 | 55.59 | 3.39 | 55.95 | 3.60 |
| 5-methylisatin-N-α-propionic acid chloride. | Red oil | | $C_{12}H_{10}ClNO_3$ | 251.67 | 57.27 | 4.00 | 57.56 | 4.35 |
| 5-iodoisatin-N-acetic acid chloride | Orange crystals (benzene/petroleum ether). | 150–155 | $C_{10}H_5ClINO_3$ | 349.52 | 34.36 | 1.44 | 34.72 | 1.49 |
| 5-fluoroisatin-N-acetic acid chloride | Orange prisms (benzene) | 188–190 | $C_{10}H_5ClFNO_3$ | 241.61 | 49.71 | 2.08 | 49.95 | 2.23 |
| 5-bromo-6-methylisatin-N-acetic acid chloride. | Yellow crystals (benzene/petroleum ether). | 186–188 | $C_{11}H_7BrClNO_3$ | 316.55 | 41.74 | 2.23 | 41.65 | 2.46 |
| 4-bromoisatin-N-acetic acid chloride | Yellow prisms (benzene) | 163–165 | $C_{10}H_5BrClNO_3$ | 302.53 | 39.71 | 1.67 | 40.10 | 1.84 |
| 5-ethylisatin-N-acetic acid chloride | Orange needles (benzene/petroleum ether). | 88–91 | $C_{12}H_{10}ClNO_3$ | 251.67 | 57.27 | 4.00 | 57.55 | 4.12 |
| 5,6-dimethylisatin-N-acetic acid chloride. | Yellow needles (benzene) | 174–176 | $C_{12}H_{10}ClNO_3$ | 251.67 | 57.27 | 4.00 | 57.61 | 4.06 |
| 5,7-dimethylisatin-N-acetic acid chloride. | Red needles (benzene/petroleum ether). | 154–156 | $C_{12}H_{10}ClNO_3$ | 251.67 | 57.27 | 4.00 | 57.60 | 4.03 |

[1] Langenbeck, Ber. 61, 944.

carbon atoms, and $R_3$ is hydrogen or lower alkyl of 1 to 4 carbon atoms, and the pharmacologically acceptable alkali metal or alkaline earth metal salts thereof.

2. A compound according to claim 1, in which the compound is the potassium salt of 6-[α-(isatin-N)-acetamido]-penicillanic acid.

3. A compound according to claim 1, in which the compound is the sodium salt of 6-[α-(isatin-N)-acetamido]-penicillanic acid.

4. A compound according to claim 1, in which the compound is 6-[α-(isatin-N)-acetamido]-penicillanic acid.

5. A compound according to claim 1, in which the compound is the potassium salt of 6-[α-(5-chloroisatin-N)-acetamido]-penicillanic acid.

6. A compound according to claim 1, in which the compound is 6-[α-(5-chloroisatin-N)-acetamido]-penicillanic acid.

7. A compound according to claim 1, in which the compound is the potassium salt of 6-[α-(5-methylisatin-N)-acetamido]-penicillanic acid.

8. A compound according to claim 1, in which the compound is the potassium salt of 6-[α-(5,6-dimethylisatin-N)-acetamido]-penicillanic acid.

9. A compound according to claim 1, in which the compound is 6-[α-(5,6-dimethylisatin-N)-acetamido-penicillanic acid.

10. A compound according to claim 1, in which the compound is 6-[α-(4-chloroisatin-N)-acetamido]-penicillanic acid.

11. A compound according to claim 1, in which the compound is the sodium salt of 6-[α-(4-chloroisatin-N)-acetamido]-penicillanic acid.

12. A compound according to claim 1, in which the compound is 6-[α-(6-chloroisatin-N)-acetamido]-penicillanic acid.

13. A compound according to claim 1, in which the compound is the sodium salt of 6-[α-(6-chloroisatin-N)-acetamido]-penicillanic acid.

14. A compound according to claim 1, in which the compound is 6-[α-(4-bromoisatin-N)-acetamido]-penicillanic acid.

15. A compound according to claim 1, in which the compound is the sodium salt of 6-[α-(4-bromoisatin-N)-acetamido]-penicillanic acid.

16. A compound according to claim 1, in which the compound is 6-[α-(5-bromoisatin-N)-acetamido]-penicillanic acid.

17. A compound according to claim 1, in which the compound is the potassium salt of 6-[α-(5-bromoisatin-N)-acetamido]-penicillanic acid.

18. A compound according to claim 1, in which the compound is 6-[α-(5-fluoroisatin-N)-acetamido]-penicillanic acid.

19. A compound according to claim 1, in which the compound is the sodium salt of 6-[α-(5-fluoroisatin-N)-acetamido]-penicillanic acid.

20. A compound according to claim 1, in which the compound is 6-[α-(5-iodoisatin-N)-acetamido]-penicillanic acid.

21. A compound according to claim 1, in which the compound is the sodium salt of 6-[α-(5-iodoisatin-N)-acetamido]-penicillanic acid.

22. A compound according to claim 1, in which the compound is 6-[α-(6-methylisatin-N)-acetamido]-penicillanic acid.

23. A compound according to claim 1, in which the compound is the sodium salt of 6-[α-(6-methylisatin-N)-acetamido]-penicillanic acid.

24. A compound according to claim 1, in which the compound is 6-[α-(7-methylisatin-N)-acetamido]-penicillanic acid.

25. A compound according to claim 1, in which the compound is the potassium salt of 6-[α-(7-methylisatin-N)-acetamido]-penicillanic acid.

26. A compound according to claim 1, in which the compound is 6-[α-(5-methoxyisatin-N)-acetamido]-penicillanic acid.

27. A compound according to claim 1, in which the compound is the potassium salt of 6-[α-(5-methoxyisatin-N)-acetamido]-penicillanic acid.

28. A compound according to claim 1, in which the compound is 6-[α-(5-bromo-6-methylisatin-N)-acetamido]-penicillanic acid.

29. A compound according to claim 1, in which the compound is the sodium salt of 6-[α-(5-bromo-6-methylisatin-N)-acetamido]-penicillanic acid.

30. A compound according to claim 1, in which the compound is 6-[D,L-α-(isatin-N)-propionamido]-penicillanic acid.

31. A compound according to claim 1, in which the compound is the sodium salt of 6-[D,L-α-(isatin-N)-propionamido]-penicillanic acid.

32. A compound according to claim 1, in which the compound is 6-[D,L-α-(5-methylisatin-N)-propionamido]-penicillanic acid.

33. A compound according to claim 1, in which the compound is the sodium salt of 6-[D,L-α-(5-methylisatin-N)-propionamido]-penicillanic acid.

34. A compound according to claim 1, in which the compound is 6-[D,L-α-(5-chloroisatin-N)-propionamido]-penicillanic acid.

35. A compound according to claim 1, in which the compound is the sodium salt of 6-[D,L-α-(5-chloroisatin-N)-propionamido]-penicillanic acid.

36. A compound according to claim 1, in which the compound is 6-[D,L-α-(5-bromoisatin-N)-propionamido]-penicillanic acid.

37. A compound according to claim 1, in which the compound is the sodium salt of 6-[D,L-α-(5-bromoisatin-N)-propionamido]-penicillanic acid.

38. A compound according to claim 1, in which the compound is 6-[α-(5,7-dimethyl-N)-acetamido]-penicillanic acid.

39. A compound according to claim 1, in which the compound is the potassium salt of 6-[α-(5,7-dimethyl-N)-acetamido]-penicillanic acid.

40. A compound according to claim 1, in which the compound is 6-[α-(5-ethylisatin-N)-acetamido]-penicillanic acid.

41. A compound according to claim 1, in which the compound is the sodium salt of 6-[α-(5-ethylisatin-N)-acetamido]-penicillanic acid.

No references cited.

NICHOLAS S. RIZZO, *Primary Examiner.*